US006868961B2

United States Patent
Ehlert et al.

(10) Patent No.: US 6,868,961 B2
(45) Date of Patent: Mar. 22, 2005

(54) ROLLER CONVEYOR WITH CLUTCHED IDLER ROLLERS

(75) Inventors: Ronald C. Ehlert, Wyoming, MI (US); Kenneth J. Kooistra, Byron Center, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 10/406,401

(22) Filed: Apr. 3, 2003

(65) Prior Publication Data

US 2003/0192775 A1 Oct. 16, 2003

Related U.S. Application Data

(60) Provisional application No. 60/372,338, filed on Apr. 12, 2002.

(51) Int. Cl.[7] .............................................. B65G 13/06
(52) U.S. Cl. ........................... 198/781.04; 198/781.01; 198/788
(58) Field of Search ........................... 198/780, 781.01, 198/781.02, 781.04, 788

(56) References Cited

U.S. PATENT DOCUMENTS

| 3,320,006 A | | 5/1967 | Cozzarin ..................... 384/132 |
| 3,320,007 A | | 5/1967 | Tennies et al. ............. 384/132 |
| 3,542,442 A | | 11/1970 | Kent ........................... 308/187 |
| 3,606,938 A | | 9/1971 | Heyne et al. .............. 188/82.1 |
| 3,782,515 A | | 1/1974 | Cowen, Jr. ................. 192/56 C |
| 4,006,815 A | * | 2/1977 | Werntz .................. 198/781.04 |
| 4,063,636 A | | 12/1977 | vom Stein .................. 198/781 |
| 4,130,191 A | | 12/1978 | Judd et al. ................ 192/41 A |
| 4,286,441 A | * | 9/1981 | Scheneman et al. ... 198/781.04 |
| 4,331,228 A | | 5/1982 | Galarowic ................... 198/341 |
| 4,421,224 A | * | 12/1983 | Dingman ............... 198/781.02 |
| 4,469,220 A | * | 9/1984 | Becker ................... 198/781.02 |
| 4,508,212 A | * | 4/1985 | Bolle et al. ............ 198/781.04 |
| 4,951,808 A | | 8/1990 | Collins et al. .............. 198/781 |
| 5,147,024 A | * | 9/1992 | Yamada ................. 198/781.02 |
| 5,161,673 A | * | 11/1992 | Cairns .................... 198/781.04 |
| 5,289,913 A | | 3/1994 | Fujio et al. ................. 198/780 |
| 5,512,972 A | | 4/1996 | Domen et al. .............. 354/319 |
| 5,924,687 A | | 7/1999 | Hannon ..................... 271/116 |
| 6,131,717 A | | 10/2000 | Owen ....................... 193/35 A |
| 6,336,542 B1 | | 1/2002 | Mintonye, II ................ 193/37 |
| 6,370,447 B1 | * | 4/2002 | Miyazaki ............... 198/781.01 |
| 6,527,097 B2 | | 3/2003 | Dreyer ..................... 193/35 A |
| 2004/0020750 A1 | | 2/2004 | Kanaris ..................... 198/788 |

* cited by examiner

*Primary Examiner*—Gene O. Crawford
(74) *Attorney, Agent, or Firm*—Van Dyke, Gardner, Linn & Burkhart, LLP

(57) ABSTRACT

A roller conveyor which includes idler rollers which are drivable in a driving direction in response to rotational driving of a drive portion of the rollers, and which are freely rotatable in the driving direction relative to the drive portions of the rollers, in order to allow for coasting of articles or products on the roller conveyor. The rollers include one-way clutch devices which may drive the rollers in the driving direction in response to activation or engagement of a drive means to convey products along the conveyor. The clutch devices also allow the rollers to continue to rotate in the driving direction after the driving means has been deactivated or disengaged from the rollers. The roller conveyor thus may convey articles along multiple zones of the conveyor and may accumulate articles on the zones, such as in response to article sensors positioned along the roller conveyor.

18 Claims, 2 Drawing Sheets

ROLLER CONVEYOR WITH CLUTCHED IDLER ROLLERS

CROSS REFERENCE TO RELATED APPLICATION

The present application claims the benefit of U.S. provisional application, Ser. No. 60/372,338, filed Apr. 12, 2002 by Ehlert et al. for CONVEYOR ROLLER WITH CLUTCH, which is hereby incorporated herein by reference.

FIELD OF THE INVENTION

The present invention relates generally to roller conveyors and, more particularly, to roller conveyors which are operable to accumulate articles thereon.

BACKGROUND OF THE INVENTION

Roller conveyors typically include a plurality of rollers mounted along and between a pair of opposite sidewalls of the conveyor. The rollers may be divided into zones, each of which may include a powered or driven or motorized roller and a plurality of idler or slave rollers interconnected to the powered roller. The rollers may be interconnected via a plurality of O-rings or bands which are wrapped around a pair of adjacent rollers. Because each idler roller may thus be connected to the powered roller via one or more bands, when the powered roller is deactivated and rotation stopped, the rotation of the connected slave rollers is also stopped via the O-rings. Packages or articles on the rollers thus cannot coast to a stop on the conveying surface. This substantially limits the ability of the conveyor to move the packages closer together while accumulating the packages at the zones of the conveyor. Also, starting and stopping of the rollers may cause slippage of the O-rings on the rollers, which may further lead to wear and eventual failure of the O-rings.

SUMMARY OF THE INVENTION

The present invention provides a roller conveyor which is capable of conveying and accumulating articles and allowing the articles to coast on the rollers to compress the articles closer together along the conveyor. The present invention provides a roller conveyor having a plurality of rollers which include a clutch and which are drivable in one direction and which may coast or freely roll in the same direction when the drive means is deactivated or disconnected from the rollers.

According to an aspect of the present invention, a roller conveyor for conveying articles along a conveying surface includes a motorized roller and a plurality of idler rollers mounted between opposite sidewalls of the roller conveyor. The motorized roller includes an internal motor which is operable to rotate a driven portion of the motorized roller relative to a shaft portion of the motorized roller. Each of the idler rollers has a roller portion and a drive portion rotatable about a shaft portion. The shaft portions mount the idler rollers to the opposite sidewalls. A plurality of drive members are drivably interconnected with at least two adjacent rollers of the motorized roller and/or the idler rollers. The drive members are configured to rotatably drive the drive portions of the respective idler rollers in a first direction in response to rotation of the driven portion of the motorized roller. Each of the idler rollers includes a clutch device operable to drive the roller portion of the idler roller in response to rotation of the drive portion in the first direction and to allow the roller portion of the idler roller to rotate in the first direction relative to the drive portion, whereby the roller portions may continue to rotate in the first direction after deactivation of the motorized roller.

The motorized roller may be operable to drive at least one of the idler rollers via at least one of the drive members. The idler roller may be drivably interconnected to at least one other of the idler rollers via another drive member. The drive members may comprise O-rings wrapped around respective adjacent pairs of rollers.

The drive portion and the roller portion of each of the idler rollers may be rotatable relative to the shaft portion via a bearing or bearing assembly. Each of the idler rollers may include a sleeve member positioned between the bearing and the drive portion and the roller portion. The roller portion of each of the idler rollers may be fixedly or non-rotatably mounted to the sleeve member, and the clutch device may be positioned between the sleeve member and the drive portion. The clutch device may be operable to rotate the sleeve member relative to the shaft portion in response to rotation of the drive portion in the first direction, while allowing rotation of the sleeve member relative to the drive portion in the first direction.

According to another aspect of the present invention, a roller conveyor for conveying articles along a conveying surface includes at least two tandem zones. Each of the zones includes a plurality of idler rollers mounted between opposite sidewalls of the roller conveyor, and a drive system. Each of the idler rollers has a roller portion and a drive portion rotatable about a shaft portion. The shaft portions mount the idler rollers to the opposite sidewalls. Each of the idler rollers includes a clutch device operable to rotatably drive the roller portion in a first direction in response to rotation of the drive portion in the first direction and to allow the roller portion to rotate in the first direction relative to the drive portion. The drive system has at least one drive member drivably engaging the drive portion of at least some of the idler rollers. The drive member is configured to rotatably drive the drive portion of the idler rollers in the first direction in response to activation of the drive system. The roller portions of at least some of the idler rollers are rotatable in the first direction when the drive system is deactivated. The tandem zones of the roller conveyor are operable to provide accumulation of articles on the conveying surface.

The drive system of each of the tandem zones may be operable independently of the drive system of the other of the tandem zones. Each of the tandem zones may include an article sensor for sensing articles on the respective zone. The drive systems may be operable in response to the article sensors.

According to yet another aspect of the present invention, a roller conveyor includes at least one roller mounted between a pair of sidewalls of the roller conveyor. The roller includes a roller portion and a shaft portion and a driving portion which is rotatably driven to rotate the roller portion relative to the shaft portion. The roller includes a clutch device which is operable to rotate the roller portion relative to the shaft portion in a first direction in response to rotation of the driving portion in the first direction. The clutch device is further operable to allow the roller portion to continue rotation in the first direction when the driving portion is stopped.

The drive portion may be a generally cylindrical sleeve portion at or near an end of the roller. The generally cylindrical sleeve portion may include at least one circumferential groove therearound, which may be adapted to receive a drive ring or belt for rotating the drive portion about the shaft portion. Optionally, the drive means for rotatably driving the drive portion may be any drive means, such as any contacting drive means, such as, for example, a belt drive system or a tape drive system, a cogged sprocket drive system or any other drive means, without affecting the scope of the present invention.

According to another aspect of the present invention, a roller for a roller conveyor includes a roller portion and a drive portion. The drive portion is rotatable to correspondingly rotate the roller portion in a first direction. The roller portion is also rotatable relative to the drive portion in the first direction, such that the roller portion is freely rotatable in the first direction relative to the drive portion when the drive portion is not rotatably driving the roller portion.

The roller includes a one-way clutch device between the roller portion and the drive portion to allow for rotation of the roller portion relative to the drive portion in one direction only. The roller portion includes a shaft end which includes a cylindrical extension or sleeve member through the drive portion. The one-way clutch device is positioned between the cylindrical extension and an inner surface of the drive portion.

Therefore, the present invention provides a roller conveyor with rollers which have clutch devices and may provide for accumulation of articles on zones of the roller conveyor. The clutch devices of the present invention may drive the respective idler rollers in response to drive members, such as O-rings or the like, and may allow the idler rollers to coast after rotational driving of the idler rollers has slowed or stopped. The clutch devices or clutched rollers thus may allow for accumulation of articles on roller conveyor zones, and also may reduce wear on the O-rings or drive members by reducing the slipping of the O-rings on the idler rollers during stopping of the drive system. The roller conveyor thus may convey articles along multiple zones of the conveyor and may accumulate articles on the zones, such as in response to article sensors positioned along the roller conveyor.

These and other objects, advantages, purposes and features of the present invention will become apparent upon review of the following specification in conjunction with the drawings.

BRIEF DESCRIPTION OF THE DRAWINGS

FIG. 5 is a partial sectional view of the conveyor roller taken along the line V—V in FIG. 3.

DESCRIPTION OF THE PREFERRED EMBODIMENTS

Figure 1:
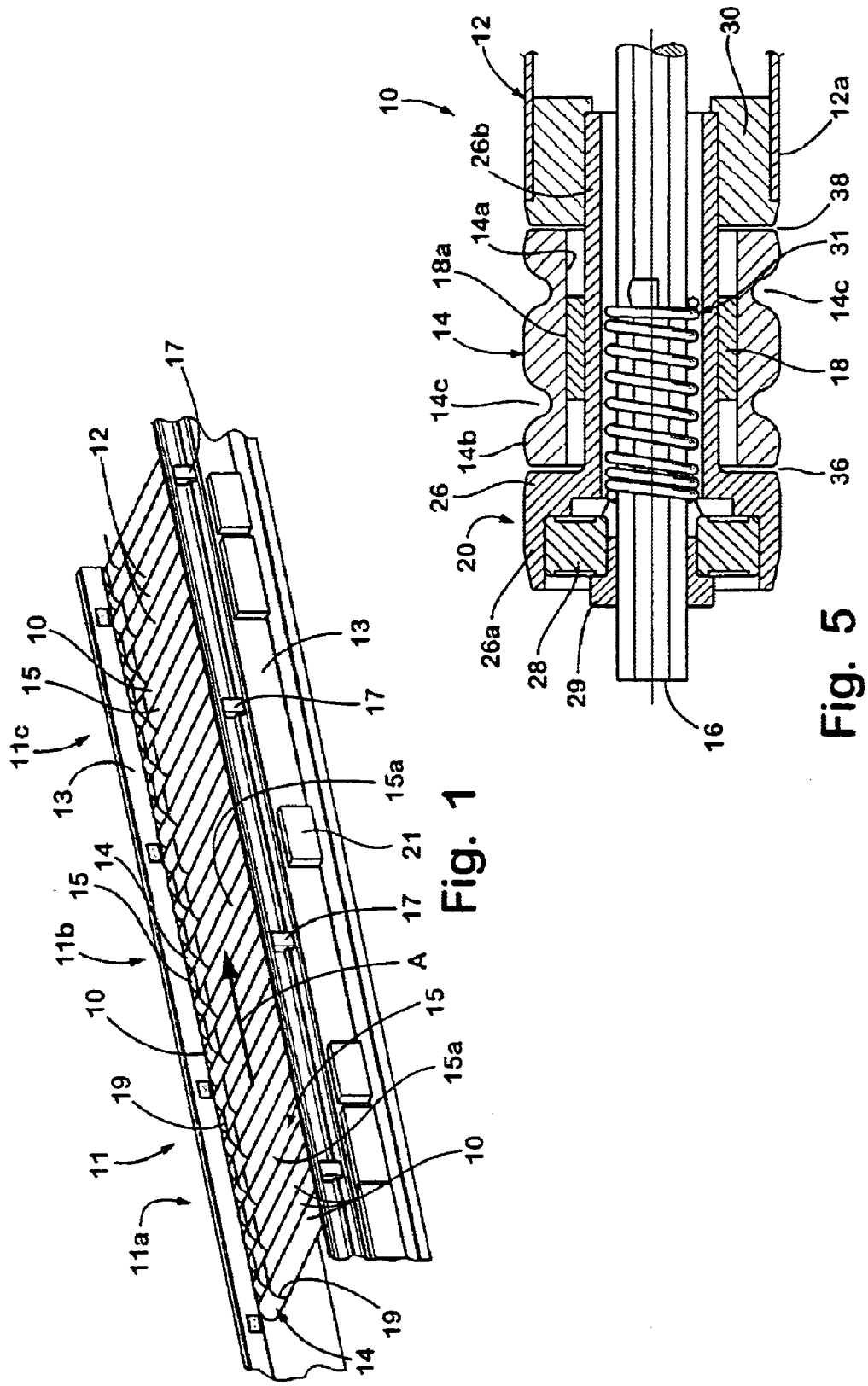
FIG. 1 is a perspective view of a roller conveyor in accordance with the present invention.
Figure 2:
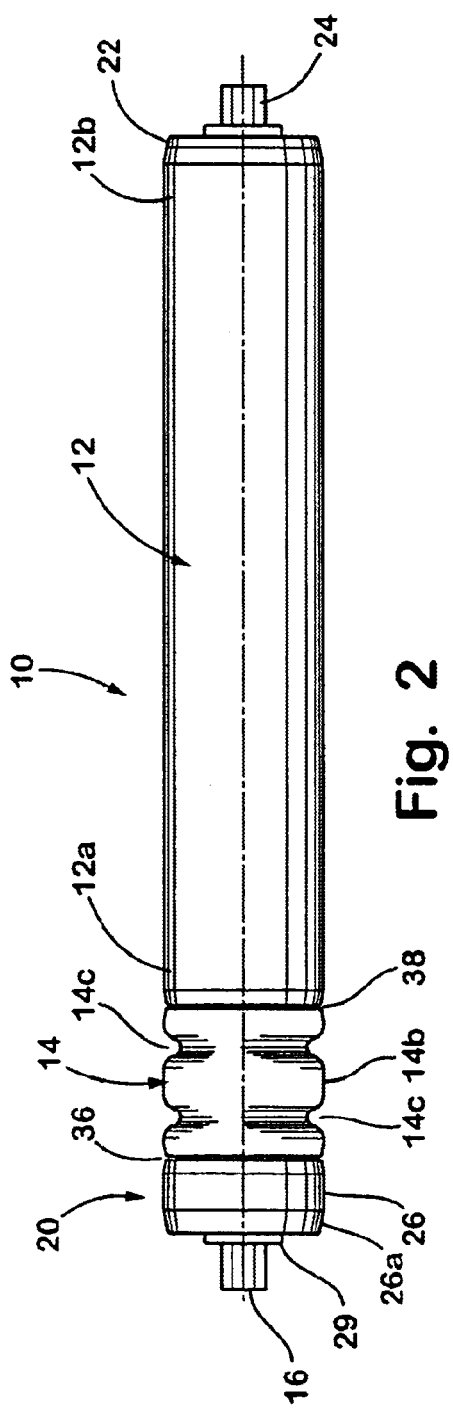
FIG. 2 is a side elevation of a conveyor roller suitable for use with the roller conveyor of FIG. 1.
Figure 3:
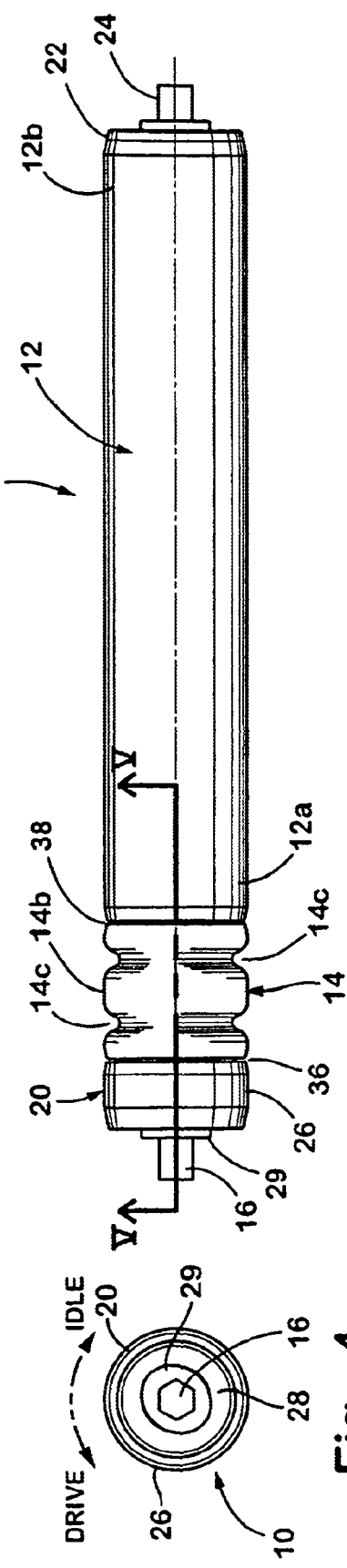
FIG. 3 is another side elevation of the conveyor roller of FIG. 2.

Referring now specifically to the drawings and the illustrative embodiments depicted therein, a roller 10 for a roller conveyor 11 includes a roller portion 12 and a drive portion 14 (FIGS. 1–3 and 5). The roller portion 12 is rotatable relative to a shaft portion 16, which is adapted for mounting the roller 10 to and between a pair of opposite sidewalls 13 of the conveyor 11. The drive portion 14 includes a one-way clutch device 18 (FIG. 5), which imparts rotation of the roller portion 12 in a driving direction to convey articles along the conveyor in a direction of conveyance. The clutch device 18 also allows drive portion 14 to rotatably drive roller portion 12, while allowing roller portion 12 to rotate relative to drive portion 14, such that the roller portion may continue to roll or coast relative to the drive portion 14 when the drive portion 14 is not rotating to drive the roller portion 12, as discussed below. In the illustrated embodiment, idler rollers 10 are idler or slave rollers and are generally rotatable relative to the shafts or axles 16 and the sidewalls 13 of the conveyor 11 in response to rotation or driving of a driven or powered or motorized roller 15 of the conveyor 11.

As shown in FIG. 1, roller conveyor 11 includes at least two tandem zones (in the illustrated embodiment of FIG. 1, there are three zones shown generally at 11a, 11b, 11c, but the roller conveyor may have more or less zones, without affecting the scope of the present invention) for conveying articles therealong. Each of the tandem zones 11a, 11b, 11c, but includes a driven or motorized roller 15 and a plurality of idler rollers 10 mounted at and between the opposite sidewalls 13 of conveyor 11. The motorized roller 15 of each zone 11a, 11b, 11c may be independently operable from the motorized roller or rollers of the other zone or zones, and may be operable or controllable via a control 21. Control 21 may be operable to control the motorized roller or drive system of each zone, such as in response to an article sensor 17 positioned along each of the zones 11a, 11b, 11c, such as in the manner disclosed in U.S. Pat. application, Ser. No. 10/358,690, filed Feb. 5, 2003 by Cotter et al. for BELT CONVEYOR, now U.S. Pat. No. 6,811,018, which is hereby incorporated herein by reference. The drive systems and/or motorized rollers of the zones thus may be operable to provide full contacting accumulation of articles on the rollers, as discussed below.

Motorized roller 15 may be operable to rotate a driven roller portion 15a of the motorized roller relative to a shaft portion (not shown) of the motorized roller via an internal motor, such as a motorized roller of the types commercially available from various sources. For example, the roller may comprise a DC motorized roller, such as a 12 volt DC motorized roller or the like, or the motorized roller may comprise a 24 volt DC motorized roller or a 42 volt DC motorized roller or a 48 volt DC motorized roller or the like. It is further envisioned that the motorized roller may comprise other DC powered motorized rollers, or may comprise an AC powered motorized roller, without affecting the scope of the present invention. In the illustrated embodiment, motorized roller 15 is positioned between idler rollers 10 of the respective zone and is operable to rotatably drive the drive portions 14 of the adjacent idler rollers 10 via drive members or O-rings 19 which are drivably interconnected between motorized roller 15 and the adjacent idler rollers 10. The adjacent idler rollers 10 may rotatably drive other adjacent idler rollers via other drive members or O-rings 19 in a similar manner.

Drive portion 14 of each idler roller 10 may be a generally cylindrical sleeve portion having an inner annular surface 14a and an outer surface 14b. In the illustrated embodiment, outer surface 14b of drive portion 14 includes a pair of circumferential grooves 14c for receiving and guiding drive bands or O-rings 19 around drive portion 14. As is known in the art, one of the O-rings may be driven by rotation of another roller (either a powered roller or a slave roller) to rotate the drive portion of the roller 10 in a driving direction, while the other O-ring is then correspondingly driven by the drive portion of the roller 10 to rotate another roller of the same zone of the roller conveyor. Although shown as being drivable via one or more O-rings or the like connected between a plurality of rollers along a respective zone of the conveyor, the rollers of the present invention may be drivable via any other means, such as discussed below, without affecting the scope of the present invention.

Roller portion 12 of each idler roller 10 may be a generally cylindrical portion and may define a portion of the conveying surface of the roller conveyor. The roller portion 12 may be rotatable relative to an elongated shaft portion 16 extending through the cylindrical roller portion, and/or the roller portion 12 may be rotatable relative to a pair of end mounts or hubs 20, 22 at opposite ends of roller portion 12, with each hub including a shaft portion 16 extending outwardly therefrom. Roller portion 12 may be generally hollow at least at its ends to at least partially receive a portion of the hubs 20, 22 therein.

In the illustrated embodiment, hub 20 includes a shaft end or shaft portion 16, which may be a hexagonal shaft portion and which extends laterally outward from roller 10 for mounting roller 10 to a respective sidewall 13 of the conveyor. However, the cross sectional shape of shaft end 16 may be other forms, without affecting the scope of the present invention. Hub 20 also includes a generally cylindrical sleeve member or end tube 26, which includes an outer portion 26a and an inner portion 26b (FIG. 5). Sleeve member 26 may be rotatably positioned over and around shaft end 16 and may be rotatably mounted or positioned at shaft end 16 via a bearing or bearing assembly 28 at outer portion 26a, such that sleeve member 26 is rotatable relative to shaft end 16 when shaft end 16 is non-rotatably mounted to the sidewall 13 of the conveyor. Bearing 28 may be positioned around an inner adapter 29, which is slidable over the shaft end and which provides an outer annular surface for bearing 28. The inner portion 26b of sleeve member 26 extends laterally inward from the outer portion 26a and from the end of shaft end 16 and extends through drive portion 14 and is at least partially received in a shell adapter 30 at an end 12a of roller portion 12. Roller portion 12 may be fixedly non-rotatably secured to inner portion 26b via shell adapter 30, such that roller portion 12 and sleeve member 26 may be rotatable together relative to shaft end 16.

Hub 20 may further include a biasing member or spring 31, which may be positioned over shaft end 16 to bias shaft end 16 outwardly from roller portion 12, such that the shaft end 16 may be biased toward engagement with the sidewall 13 of the conveyor. The shaft end 16 may then be pushed inwardly to disengage the shaft end from the sidewall 13 of the conveyor, as is known in the art.

Although not shown in the drawings, hub 22 at the opposite end 12b of roller portion 12 may be substantially similar to hub 20, except that the sleeve portion 32 only extends within the end 12b of roller portion 12, and does not include the elongated inner portion, because the sleeve portion does not have to extend through the drive portion 14 of roller 10. The hub 22 functions to rotatably mount or secure end 12b of roller portion 12 to an opposite shaft end 24 of roller 10. The shaft ends 16 and 24 may be the ends of a single, elongated shaft extending through roller 10, or may be separate shaft portions, for mounting a respective end of the roller to the sidewalls of the conveyor, without affecting the scope of the present invention.

As shown in FIG. 5, drive portion 14 may be radially spaced from inner portion 26b of sleeve member 26 with one-way clutch device 18 positioned therebetween. Drive portion 14 may be positioned between outer portion 26a and shell adapter 30 and spaced from each, such that a gap 36, 38 exists between drive portion 14 and a respective one of sleeve member 26 and roller portion 12, in order to limit or substantially preclude interference or contact between drive portion 14 and sleeve member 26 and/or roller portion 12 during operation of the roller conveyor. Clutch device 18 may be a generally cylindrical-shaped clutch device which may be secured to the inner surface 14a of drive portion 14 and provides for relative rotation between drive portion 14 and inner portion 26b in one direction only. Clutch device 18 may comprise a known type of clutch bearing, such as a Torrington clutch bearing or the like. For example, clutch device 18 may include a plurality of bearings (not shown) within a cylindrical casing 18a. The bearings may allow free rotation of drive portion 14 relative to inner portion 26b in one direction, while shims, wedges, or the like (also not shown) may limit or substantially preclude rotation of the drive portion 14 relative to inner portion 26b of sleeve member 26 in the opposite direction.

Figure 4:
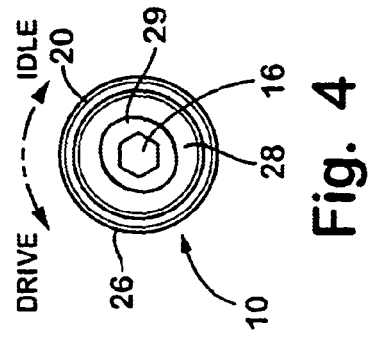
FIG. 4 is an end elevation of the conveyor roller of FIGS. 2 and 3.

As can be seen with reference to FIGS. 4 and 5, drive portion 14 may be rotatable about inner portion 26b of sleeve 26 in the clockwise direction only, if the inner portion 26b is held or fixed or otherwise not-rotated. In other words, inner portion 26b, and thus roller portion 12, may be rotatable relative to drive portion 14 in the counter-clockwise direction only, if the drive portion were held or fixed or were otherwise not rotating. Therefore, when drive portion 14 is rotated in the counter-clockwise or drive direction, clutch device 18 causes sleeve 26 to also rotate in the counter-clockwise direction, which in turn causes roller portion 12 to rotate in the counter-clockwise direction. However, when drive portion 14 is stopped, such as in response to deactivation of driven or motorized roller 15, sleeve 26 and roller portion 12 may continue to rotate in the counter-clockwise direction relative to the drive portion 14.

During operation, as drive portion 14 of each idler roller 10 is rotatably driven in a driving direction (such as in the counter-clockwise direction in FIG. 4) via O-ring 19 or other contacting drive means or the like, drive portion 14 and clutch device 18 impart a corresponding rotation to inner portion 26b of hub 20, and thus to roller portion 12, relative to shaft portion 16. The rotation of roller portion 12 in the driving direction causes products on the roller to be conveyed in a direction of conveyance A of the conveyor 11. The roller portion 12 is driven in this direction by the drive portion 14 because clutch device 18 may limit or substantially preclude relative rotation of drive portion 14 and inner portion 26b in this direction.

However, relative rotation in the other direction (such as rotation of drive portion 14 relative to roller portion 12 in the clockwise direction in FIG. 4) is not limited by clutch device 18. Because rotation of drive portion 14 in the other direction is not limited by clutch device 18, rotation of inner portion 26b and roller portion 12 in the driving direction relative to drive portion 14 is not limited by clutch device 18. Roller portion 12 is thus freely rotatable relative to shaft portion 16 and drive portion 14 in the driving direction. Accordingly, when drive portion 14 of each idler roller 10 is stopped, such as when the powered roller 15 is deactivated or when another contacting drive means is deactivated, roller portion 12 may continue to rotate or coast in the driving direction relative to drive portion 14 to allow products being conveyed therealong to coast to a stop on the conveyor. The present invention thus allows products to coast along the conveyor to contact other products positioned downstream on the conveyor, thereby allowing the products to be compressed together along the conveyor, such that a greater number of products may be accumulated on the zone or zones 11a, 11b, 11c of conveyor 11. The present invention thus may provide full contacting accumulation of articles on the zones of the roller conveyor.

It is envisioned that the rollers of the roller conveyor of the present invention may be driven via any other drive means, which may contact or engage drive portions of the rollers to drive the drive portions, and thus the roller portions, in a driving direction. For example, the drive portions may have a generally cylindrical outer surface, which may engage a belt or tape of a tape drive system along a lower surface of the drive portions, such as a tape drive system of the type disclosed in commonly assigned, U.S. provisional applications, Ser. No. 60/427,305, filed Nov. 18, 2002 by Cotter for TAPE DRIVE CONVEYOR; Ser. No. 60/420,508, filed Oct. 23, 2002 by Cotter for TAPE DRIVE CONVEYOR; and Ser. No. 60/372,168, filed Apr. 12, 2002 by Cotter for TAPE DRIVE CONVEYOR, which are hereby incorporated herein by reference. Alternately, the drive portions may include a plurality of teeth or grooves, which may be engaged with rotatably driven sprockets or chain or the like, without affecting the scope of the present invention. Any other drive means, particularly contacting drive means, which contact and drive and rotate the drive portions of the rollers, may otherwise be implemented with the one-way rollers of the present invention, without affecting the scope of the present invention.

Therefore, the present invention provides a roller conveyor with one-way driven idler rollers which are freely rotatable in one direction relative to drive portions of the rollers, in order to allow for coasting of articles or products on the conveyor. The conveyor rollers include one-way clutch devices which may drive the rollers in a driving direction in response to activation or engagement of a drive means to convey products along the conveyor. The clutch devices also allow the rollers to continue to rotate in the driving direction after the driving means has been deactivated or disengaged from the rollers. The rollers thus may continue to rotate to coast articles or products along the conveyor to compress the articles together on the conveyor. The clutch device and roller conveyor of the present invention thus may drive the idler rollers in response to drive members, such as O-rings or the like, and may allow the idler rollers to coast after rotational driving of the idler rollers has stopped. The clutch device thus allows for accumulation of articles on roller conveyor zones, and also reduces wear on the O-rings or drive members by reducing the slipping of the O-rings on the idler rollers during stopping of the drive system. The roller conveyor thus may convey articles along multiple zones of the conveyor and may accumulate articles on the zones, such as in response to article sensors positioned along the roller conveyor.

Changes and modifications in the specifically described embodiments may be carried out without departing from the principles of the present invention, which is intended to be limited only by the scope of the appended claims, as interpreted according to the principles of patent law.

The embodiments of the invention in which an exclusive property right or privilege is claimed are defined as follows:

1. A roller conveyor for conveying a articles along a conveying surface, said roller conveyor comprising:
    a motorized roller mounted between opposite sidewalls of said roller conveyor, said motorized roller having an internal motor operable to rotate a driven portion of said motorized roller relative to a shaft portion of said motorized roller;
    a plurality of idler rollers mounted between said opposite sidewalk, each of said idler rollers having a roller portion and a drive portion rotatable about a shaft portion, said shaft portions mounting said idler rollers to said opposite sidewalls, said drive portion and said roller portion of each of said plurality of idler rollers being rotatable relative to said shaft portion via a bearing, each of said idler rollers including a sleeve member positioned between said bearing and said drive portion and said roller portion; and
    a plurality of drive members drivably interconnected with at least two adjacent rollers of said motorized roller and said idler rollers, said drive members being configured to rotatably drive said drive portions of said idler rollers in a first direction in response to rotation of said driven portion of said motorized roller, each of said idler rollers including a clutch device operable to drive said roller portion of said idler roller in response to rotation of said drive portion in said first direction and to allow said roller portion of said idler roller to rotate in said first direction relative to said drive portion, wherein said roller portion of each of said idler rollers is non-rotatably mounted to said sleeve member and said clutch device is positioned between said sleeve member and said drive portion.

2. The roller conveyor of claim 1, wherein said roller conveyor comprises at least two tandem zones operable to provide accumulation of articles on the conveying surface.

3. The roller conveyor of claim 1, wherein said drive members comprise O-rings wrapped around respective adjacent pairs of rollers.

4. The roller conveyor of claim 1, wherein said motorized roller is operable to drive at least one of said plurality of idler rollers via at least one of said drive members, said at least one of said plurality of idler rollers being drivably interconnected to at least one other of said plurality idler rollers via another of said drive members.

5. The roller conveyor of claim 4, wherein said drive members comprise O-rings wrapped around respective adjacent pairs of rollers.

6. The roller conveyor of claim 1, wherein said clutch device is operable to rotate said sleeve member relative to said shaft portion in response to rotation of said drive portion in said first direction.

7. The roller conveyor of claim 6, wherein said clutch device is operable to allow rotation of said sleeve member relative to said drive portion in said first direction.

8. A roller conveyor for conveying articles along a conveying surface, said roller conveyor comprising:
    at least two tandem zones, each of said zones comprising:
        a plurality of idler rollers mounted between opposite sidewalls of said roller conveyor, each of said plurality of idler rollers having a roller portion and a drive portion rotatable about a shaft portion, said shaft portions mounting said idler rollers to said opposite sidewalls, each of said idler rollers including a clutch device operable to rotatably drive said roller portion in response to rotation of said drive portion in a first direction and to allow said roller portion, to rotate in said first direction relative to said drive portion said drive portion and said roller portion being rotatable relative to said shaft portion via a bearing, each of said idler rollers including a sleeve member positioned between said bearing and said drive portion and said roller portion; and
        a drive system having at least one drive member drivable engaging said drive portion of at least some of said idler rollers, said at least one drive member being configured to rotatably drive said drive portion of said at least some of said idler rollers in said first direction in response to activation of said drive system, said roller portion of at least some of said idler rollers being rotatable in said first direction when said drive system is deactivated, said at least two tandem zones of said roller conveyor being operable to provide accumulation of articles on the conveying surface, wherein said roller portion is non-rotatably mounted to said sleeve member and said clutch device is positioned between said sleeve member and said drive portion.

9. The roller conveyor of claim 8, wherein said clutch device is operable to rotate said sleeve member relative to said shaft portion in response to rotation of said drive portion in said first direction.

10. The roller conveyor of claim 9, wherein said clutch device is operable to allow rotation of said sleeve member relative to said drive portion in said first direction.

11. The roller conveyor of claim 8, wherein said drive system of each of said at least two tandem zones is operable independently of the drive system of the other of said at least two tandem zones.

12. The roller conveyor of claim 11 control operable to control said drive systems.

13. The roller conveyor of claim 12, wherein each of said at least two tandem zones includes an article sensor for sensing articles on the respective zone, said control being operable to control each of said drive systems in response to a respective one of said article sensors.

14. The roller conveyor claim 8, wherein said drive system comprises a driven roller operable to drive at least one of said plurality of idler rollers via said at least one drive member.

15. The roller conveyor of claim 14, wherein said at least one of said plurality of idler rollers is drivably interconnected to at least one other of said plurality idler rollers via another drive member.

16. The roller conveyor of claim 14, wherein said driven roller comprises a motorized roller having an internal motor operable to rotate a driven portion of said motorized roller relative to a shaft portion of said motorized roller.

17. The roller conveyor of claim 14, wherein said at least one drive member comprises at least one O-ring wrapped around said driven roller and said drive portion of at least one of said idler rollers.

18. The roller conveyor of claim 17, wherein said drive portion of at least some of said idler rollers is drivably interconnected to a drive portion of another idler roller via another O-ring.

* * * * *